United States Patent [19]

Bradley

[11] 3,846,593

[45] Nov. 5, 1974

[54] TELEPHONE LINE TEST SYSTEM

[76] Inventor: Frank R. Bradley, 9 Dash Pl., Bronx, N.Y. 10463

[22] Filed: Oct. 31, 1973

[21] Appl. No.: 411,274

[52] U.S. Cl. ........................ 179/175.3 R, 324/57 DE

[51] Int. Cl. ............................................ H04b 3/46

[58] Field of Search ............ 179/175.3 R; 178/69 R; 324/57 DE; 328/155

[56] References Cited

UNITED STATES PATENTS

| | | | |
|---|---|---|---|
| 2,214,130 | 9/1940 | Green et al. | 179/175.3 R |
| 2,337,541 | 12/1943 | Burgess | 179/175.3 R |
| 2,929,987 | 3/1960 | Noland et al. | 179/175.3 R |
| 3,434,061 | 3/1969 | Hahn et al. | 328/155 |

*Primary Examiner*—Kathleen H. Claffy
*Assistant Examiner*—Douglas W. Olms
*Attorney, Agent, or Firm*—Gottlieb, Rackman, Reisman & Kirsch

[57] ABSTRACT

There is disclosed a system for transmitting a complex test signal of several frequency components along a transmission path and cancelling any frequency shift distortion which is introduced by the path. A resolver is used to intoduce a frequency shift in each component at the transmitting end of the path, this frequency shift then being cancelled out as the complex signal travels along the path. The technique is based on the compensating circuit disclosed in my co-pending application Ser. No. 358,663, now U.S. Pat. No. 3,812,433 but the feedback signal, derived at the receiving end of the transmission path and transmitted back to the transmitting end by digital techniques to avoid distortion, is used to cause the resolver to prespin in order to introduce a frequency shift in each signal component which is then cancelled during transmission.

7 Claims, 3 Drawing Figures

TELEPHONE LINE TEST SYSTEM

This invention relates to transmission path test systems, and more particularly to automatic test systems for telephone lines.

Two of the most important types of measurement for a transmission path, and in particular for a telephone line, are those of gain and envelope delay as a function of frequency. The gain versus frequency characteristic depicts the attenuation along the line as a function of frequency. The envelope delay provides an indication of the ratio of incremental phase change to incremental frequency change as a function of frequency. The conventional approach in taking these two types of measurement is to transmit a known signal down the line and to perform measurements at the terminal end. Typically, 16 frequency signals in the voiceband are transmitted. Each frequency signal has a predetermined amplitude and phase relative to the others, and all of the signals are multiples of 15⅝ Hz in accordance with recent telephone practice. At the terminal end of the line, the amplitude of each frequency signal can be measured to determine the gain versus frequency characteristic. Similarly, since the original phase relationships of the individual signals are known, the phase change between adjacent frequency signals can be determined at the terminal end; if each phase change is divided by the frequency difference between two adjacent signals, and the resulting ratios are plotted as a function of frequency, there results what is known as the envelope delay characteristic.

One of the problems with this kind of test procedure is that it generally requires complex equipment and telephone company personnel at both ends of the line. This severely limits testing of the line at different times of the day. An even greater problem perhaps is that of frequency shift down the line. Each signal component which is transmitted down the line often has its frequency changed. Although all components exhibit the same frequency shift, because the received frequency components at the terminal end of the line have different frequencies from those transmitted, the measurement procedures become exceedingly complex. One solution to this problem is to transmit the test signal down one line and back over another since the frequency shift introduced in one direction is usually cancelled out in the other. Unfortunately, however, this permits gain and envelope delay measurements to be taken only around the entire loop, whereas what is often desired are the measurements from one site to another.

It is a general object of my invention to provide a test system for allowing a group of signal components of predetermined frequencies to be transmitted along a transmission path from one site to another with no apparent frequency shift being exhibited at the terminal end of the path.

Briefly, in accordance with the principles of my invention, I utilize the frequency compensation technique disclosed in my co-pending application Ser. No. 358,663 now U.S. Pat. No. 3,812,433 filed on May 9, 1973 and entitled "Frequency Difference Measuring And Compensating Circuit". As taught in that application, a conventional resolver can be used to eliminate the frequency shift in each of many components of a complex signal. The technique entails the use of a feedback circuit for controlling the spinning of an electromechanical resolver, or the accomplishment of the same function by purely electronic means. (The use of the term resolver herein is meant to include electronic equivalents.) In accordance with the present invention, a known complex signal is sent down a transmission path in one direction. The feedback signal, of the type described in my above-identified application, is fed back in the other direction to the transmitting end of the path. The feedback signal in effect introduces a pre-spin in the resolver at the transmitting end; the pre-spin introduces a frequency shift at the transmitting end which is equal and opposite to the frequency shift introduced by the transmission path. Consequently, at the receiving end a complex signal can be processed without regard to frequency shift.

Further objects, features and advantages of my invention will become apparent upon consideration of the following detailed description in conjunction with the drawing, in which.

Figure 1:
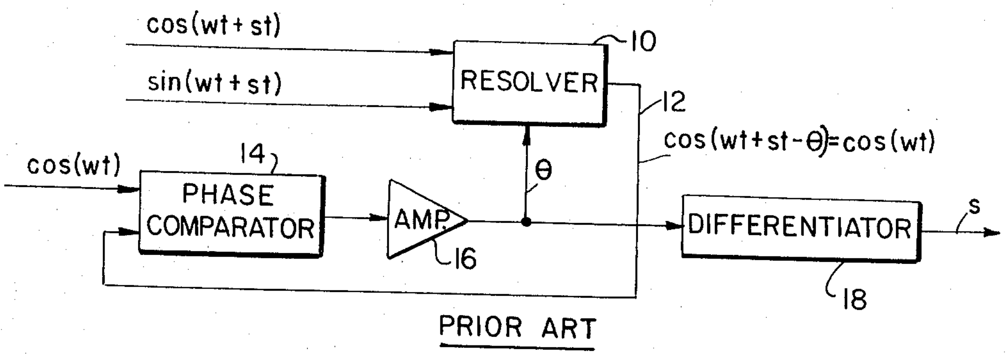
PRIOR ART FIG. 1
FIG. 1 depicts the prior art frequency difference measuring circuit described in detail in my above-identified application.

The circuit of FIG. 1 functions to measure the frequency difference between two signals cos(wt+st) and cos(wt). Two signals in quadrature are applied to two of the inputs of resolver 10. The third input of the resolver is an electrical signal which represents an angular input labelled $\theta$. (Typically, the resolver is an electromechanical device, with the signal functioning to control the turning of a shaft.) The output of the resolver is a signal of the form $\cos(wt+st-\theta)$, and this signal is applied to one input of phase comparator 14. The phase comparator generates an output signal which is proportional to the difference between the phases of the signals at its two inputs. The difference signal is applied to the input of high-gain amplifier 16, whose output signal is applied to the $\theta$ input of the resolver.

Since the high-gain amplifier is provided in the feedback path from the output of the resolver to the $\theta$ input, the amplifier output is automatically adjusted to a level $\theta$ such that the output of the phase comparator is at a null. In other words, because of the very high gain of the amplifier, even a negligible signal level at its input can control the generation of a $\theta$ signal of the proper magnitude to force the two inputs of the comparator to be in phase. Since the feedback circuit functions to force the output of the resolver to "chase" the input cos(wt), it is apparent that the phase of $\cos(wt+st-\theta)$ equals the phase of cos(wt), or $\theta$=st. Therefore, if the $\theta$ signal is differentiated, its derivative is equal to the difference frequency $s$. This frequency difference is derived in the circuit of FIG. 1 by employing differentiator 18 to differentiate the $\theta$ signal.

It should be noted that the $\theta$ signal is a periodic one. With an electromechanical resolver the periodicity is automatically inserted by rotation of the resolver. The phase comparator 14 is a conventional circuit having both an acquisition and a tracking mode. In the acquisition mode the comparator provides direction information; when the resolver has reached the correct speed (and direction), the comparator functions as a pure phase comparator. Lock is achieved between two nominally unequal frequencies, without changing either of them, by the introduction of a controlled continuous phase shift. As described in my co-pending application, the basic "phase-chasing" feedback technique of FIG. 1 can be used where a complex signal is transmitted along a channel. In such a case, even if complex quadradure signals are applied to two inputs of the resolver, the resolver functions to shift the phase of each component by the same angle $\theta$. This type of operation is possible because the resolver is a linear device, each input frequency signal having its phase shifted by the same value $\theta$.

Figure 2:
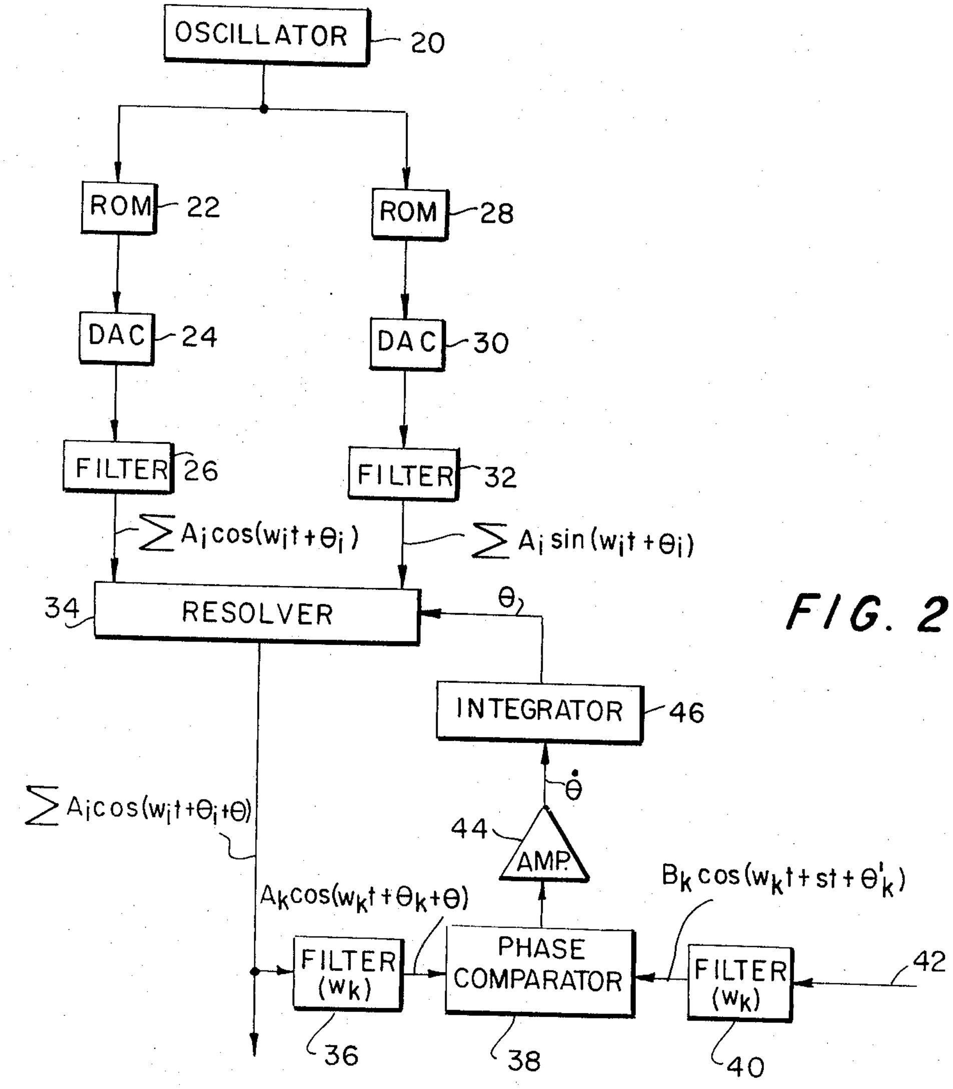
FIG. 2 depicts the principles of the present invention insofar as they incorporate the technique embodied in the circuit of FIG. 1, although the circuit of FIG. 2 does not actually depict an illustrative embodiment of the present invention inasmuch as it does not include a transmission path.

In the circuit of FIG. 2, two complex signals, which consist of paired quadrature components, are derived by using read only memories, digital-to-analog converters and filters. Although this particular technique is shown for deriving two complex signals of the forms $\Sigma A_i\cos(w_it+\theta_i)$ and $\Sigma A_i\sin(w_it+\theta_i)$, other techniques for deriving the complex signals can be employed. In the circuit of FIG. 2, oscillator 20 generates a clock signal which is applied to read only memory 22 at periodic intervals. The successive words read out of the memory represent samples of the desired complex signal. Each sample is converted to an analog level by digit-to-analog converter 24, and successive analog levels are smoothed by filter 26. The resulting signal represents a complex of frequency components. In this complex, each frequency component has a predetermined amplitude and phase. Similarly, read only memory 28, digit-to-analog converter 30 and filter 32 function in the same way to derive another complex signal. Each frequency is thus represented by two quadradure signals of the same amplitude at different inputs of the resolver. (The frequencies of the several components are all multiples of some low frequency, for example, 15⅝ Hz.)

The $\theta$ input signal to resolver 34 causes the resolver output to take the form $\Sigma A_i\cos(w_it+\theta_i+\theta)$. Although in the circuit of FIG. 1 the phase angle input is subtracted from each cosine signal, the circuit of FIG. 2 employs a resolver which adds the phase angle to each cosine component. The resolver output is applied to the input of filter 36 which filters out all frequency components other than that having a frequency $w_k$. The filter output is thus of the form $A_k\cos(w_kt+\theta_k+\theta)$ as shown in the drawing, and this signal is applied to one input of phase comparator 38. Another signal of the form $B_k\cos(w_kt+st+\theta_k')$, where $\theta_k'$ is an arbitrary phase angle, is applied to the other input of the phase comparator. This signal can be derived from a complex signal on conductor 42 which is extended through a filter 40 whose center frequency is also at $w_k$, but the source of the signal at the second input of the phase comparator is not important for present purposes. The output of the phase comparator is amplified by amplifier 44 and is applied to the input of integrator 46. The output of the integrator, applied to the phase angle input of the resolver, is labelled $\theta$. Thus, the output of amplifier 44 is necessarily the derivative of the phase angle $\theta$, and is shown by the symbol $\dot{\theta}$. The output of the phase comparator is forced to a null condition in the same manner that the output of phase comparator 14 in FIG. 1 is nulled. This requires that the phases of the two input signals to phase comparator 38 be identical. (The two signals may have different amplitudes, as shown in the drawing, without affecting the operation of the phase comparator.) Consequently, $(\theta_k+\theta) = (st+\theta_k')$, and thus $\theta = st+\theta_k'-\theta_k$. It is thus apparent that the output of amplifier 44, which is the derivative of the $\theta$ signal, must be equal to the frequency difference $s$.

The resolver output, shown in FIG. 2 as being of the form $\Sigma A_i\cos(w_it+\theta_i+\theta)$, after the substitution $\theta=st+\theta_k'-\theta_k$ is made, is $\Sigma A_i\cos(w_it+\theta_i+st+\theta_k'-\theta_k)$. The main difference between the circuits of FIGS. 1 and 2 is that in the former the signal $\theta$ is used to eliminate the st term in the $\cos(wt+st)$ resolver input, while in the circuit of FIG. 2 the resolver is used to add a $\theta$ term (which includes an st component) to the argument of each cosine signal in the complex output of the resolver. Thus the resolver is made to pre-spin to add an st term to the argument of each cosine function in accordance with a feedback signal, rather than to eliminate an st term in each cosine argument at the input to the resolver. The reason for introducing this pre-spin in the resolver will become apparent upon a consideration of the embodiment of the invention shown in FIG. 3.

Figure 3:
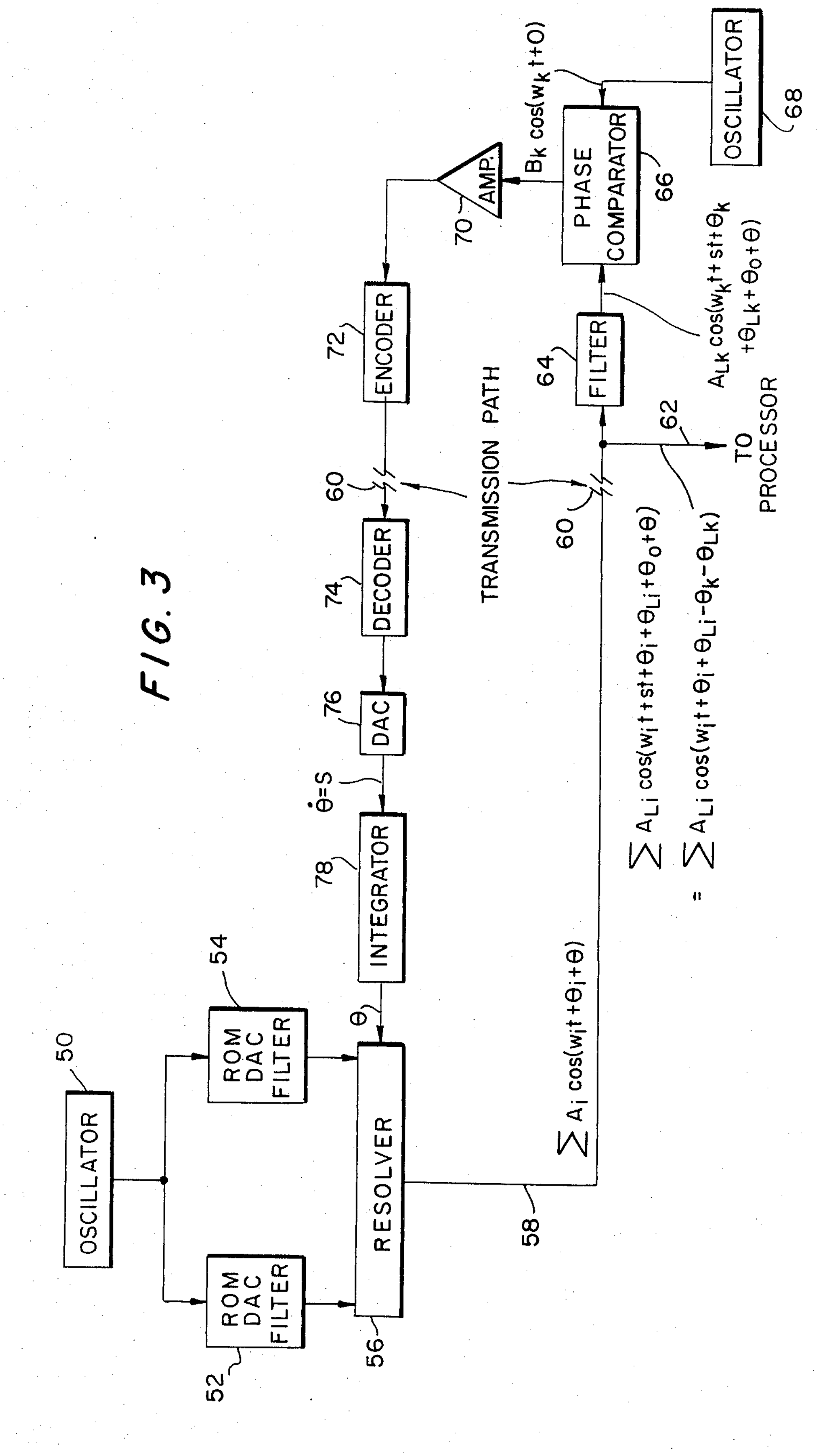
FIG. 3 depicts the illustrative embodiment of the present invention.

In the circuit of FIG. 3, oscillator 50 controls the periodic operation of elements 52, 54 - - each of which includes a read only memory, a digital-to-analog converter and a filter of the type shown in FIG. 1. The two inputs to resolver 56 which are controlled by the read only memories are of the same form as those shown in FIG. 2, and the third input of the resolver is an electrical signal representing a phase angle $\theta$. The output of the resolver, of the form $\Sigma A_i\cos(w_it+\theta_i+\theta)$ is thus identical to the output of the resolver of FIG. 2.

The resolver output is applied to conductor 58 which is part of a transmission path symbolized by the numeral 60. At the terminal end (receiving end) of the transmission path, the complex signal is of the form $\Sigma A_{Li}\cos(w_it+st+\theta_i+\theta_{Li}+\theta_o+\theta)$. As transmitted, the amplitude of each frequency component is $A_{Li}$ - - the transmission line changes the amplitude of each frequency component by a different amount. With respect to the argument of each cosine function, it will be noted that the argument at the transmitter end is $(w_it+\theta_i+\theta)$ while at the receiving end the argument is $(w_it+st+\theta_i+\theta_{Li}+\theta_o+\theta)$. The additional st term represents the frequency shift introduced by the transmission path. The additional $\theta_o$ term represents a phase shift which is known as "phase intercept distortion"; the phase of every component is changed by this fixed amount. The additional term $\theta_{Li}$ represents a phase shift unique to the respective frequency component introduced by the line.

This complex signal is applied through filter 64 which filters all frequencies other than the $w_k$ component. Consequently, the output of filter 64, as shown in the drawing, is of the form $A_{Lk}\cos(w_kt+st+\theta_k+\theta_{Lk}+\theta_o+\theta)$, without regard to the phase shift introduced by the filter which does not change the system theory or operation. This signal is applied to one input of phase comparator 66.

Oscillator 68 generates a signal of the form $B_k\cos(w_kt)$. For voiceband measurements, oscillators 60 and 68 should be matched in frequency with an accuracy preferably of at least one part in $10^5$. It is assumed that the phase of oscillator 68 is 0; what is important are relative phase differences, and it is convenient to assume that the signal at the output of oscillator 68 has the reference phase. This signal is applied to the other input of phase comparator 66, whose output is applied to the input of amplifier 70. Referring to FIG. 2, it will be apparent that the circuits of FIGS. 2 and 3 are quite similar except that in the circuit of FIG. 3 the output of amplifier 70 is extended to the input of encoder 72, the output signal from which is transmitted over transmission path 60 in the opposite direction to decoder 74. The decoder output -- which is of digital form in the illustrative embodiment of the invention (although analog transmission can be used, if desired) -- is converted to an analog signal by digital-to-analog converter 76, which analog signal is applied to the input of integrator 78. Neglecting encoder 72, decoder 74 and digital-to-analog converter 76 for the moment, and considering that the output of amplifier 70 is coupled directly to the input of integrator 78, it will be apparent that there is a one-to-one correspondence between the circuits of FIGS. 2 and 3. Consequently, the input to integrator 78 represents the derivative of the phase angle $\theta$, and is equal to the phase shift st which is introduced along transmission path 60 from the transmitting end to the receiving end of the line.

The reason for using encoder 72, decoder 74 and digital-to-analog converter 76 is to insure that the input to integrator 78 is identical to the output of amplifier 70. There is to be no distortion of the signal at the output of amplifier 70 as it is transmitted back toward the transmitting end of the line. By encoding the signal at the output of amplifier 70 and transmitting digital samples, which are then converted back to analog form, the signal at the input of integrator 78 is identical to the signal at the output of amplifier 70.

Recalling that phase comparator 66 functions to maintain equal the arguments of the two cosine functions at its inputs, it is apparent that $(w_k t+st+\theta_k+\theta_{Lk}+\theta_o+\theta)=(w_k t)$. Consequently, $\theta=-(st+\theta_k+\theta_{Lk}+\theta_o)$.

When this value of $\theta$ is substituted in the expression for the complex signal on conductor 58, the resulting complex signal, as shown in FIG. 3, is of the form $\Sigma A_{Li}\cos(w_i t+\theta_i+\theta_{Li}-\theta_k-\theta_{Lk})$.

The importance of this is that the complex signal at the receiving end of the transmission path is seen not to contain any st term, that is, the received signal exhibits no frequency shift in any of its components. This is due to the fact that the $\theta$ signal at the input of resolver 56 functions to pre-spin the resolver so as to introduce a frequency shift st in each frequency component. It is this deliberately inintroduced frequency shift (represented by the term $\theta$ in the expression for the complex signal on conductor 58) which is cancelled out as the signal is transmitted down the transmission path.

The signal at the far end of the transmission path (at the input of filter 64) can be extended over conductor 62 to a processor, preferably, a processor which is capable of fast Fourier transform analysis. The fact that each signal has its phase shifted by the same amount, $(-\theta_k-\theta_{Lk})$ is of no moment; the parameter of interest is envelope delay which is independent of phase offsets. Since the $\theta_i$ phase term in each cosine signal is known (this term is included in the complex signals applied to the inputs of the resolver, as shown in FIG. 2), it is the $\theta_{Li}$ terms which when measured represent relative phase shifts in the various transmitted components. The relative amplitudes of the signals, together with their relative phase shifts, enable the gain and envelope delay characteristics to be determined as is known in the art. The analysis of the signals do not comprise a part of the present invention, since the analysis of such signals is known to those skilled in the art of telephony. What the invention is concerned with is the derivation at the receiving end of a transmission path of a complex signal which is identical in form to a generated test complex signal except for changes introduced by the gain and envelope delay characteristics of the transmission path.

Of equal significance is the fact that the equipment at the far end of the transmission path (to the right of transmission path 60 in FIG. 3) can be left unattended by telephone personnel, but with a small processor connected to conductor 62. Control signals can be transmitted at any time by appropriate control circuits at the transmitting end to the processor at the receiving end to control its operations. The test results can be recorded at several different times without requiring any supervision at the receiving end. The timing of operations at the receiving end can be under the control of oscillator 68.

Although the invention has been described with reference to a particular embodiment, it is to be understood that this embodiment is merely illustrative of the application of the principles of the invention. For example, instead of providing a separate oscillator 68 at the receiving end, filter 64 can be replaced by two filters, one of whose center frequency is twice the other's along the lines depicted in FIG. 3 of my above-identified co-pending application. Thus it is to be understood that numerous modifications may be made in the illustrative embodiment of the invention and other arrangements may be devised without departing from the spirit and scope of the invention.

What I claim is:

1. A system for transmitting a predetermined complex signal having at least two frequency components therein along a transmission line from the transmitting end to the receiving end thereof, with the frequency shifts which are introduced by the transmission line being cancelled, comprising means for continuously shifting the phase of each frequency component in said complex signal prior to its transmission, means for comparing the phase of one of the received frequency components with the phase of a reference signal of the same frequency to derive a measure of the phase difference, means for transmitting a control signal indicative of the phase difference from the receiving end of the line to the transmitting end of the line, and means for controlling said phase shifting means in accordance with said control signal such that the phase shifts introduced at the transmitting end of the line are cancelled out by the line as said complex signal travels from the transmitting end to the receiving end thereof.

2. A system in accordance with claim 1 wherein said phase shifting means is a resolver having predetermined quadrature complex signals applied to two inputs thereof, said resolver being operative to continuously shift the phase of each frequency component at the output thereof in accordance with said control signal.

3. A system in accordance with claim 2 wherein said phase shift controlling means includes means for integrating said control signal and for causing the phase of each frequency component at the output of said resolver to be changed by the value of the integral of said control signal.

4. A system in accordance with claim 3 wherein said control signal is transmitted from said receiving end to said transmitting end of said transmission line in the form of digitally encoded signals.

5. A system in accordance with claim 4 wherein said control signal transmitting means includes a high-gain amplifier therein such that the input thereof is nulled.

6. A system in accordance with claim 1 wherein said control signal is transmitted from said receiving end to said transmitting end of said transmission line in the form of digitally encoded signals.

7. A system in accordance with claim 6 wherein said control signal transmitting means includes a high-gain amplifier therein such that the input thereof is nulled.

* * * * *